(12) United States Patent
Puglisi (10) Patent No.: US 12,319,353 B2
(45) Date of Patent: Jun. 3, 2025

(54) HOOD FOR A MOTOR VEHICLE

(71) Applicant: FERRARI S.P.A., Modena (IT)

(72) Inventor: Gabriele Puglisi, Modena (IT)

(73) Assignee: FERRARI S.p.A., Modena (IT)

( * ) Notice: Subject to any disclaimer, the term of this patent is extended or adjusted under 35 U.S.C. 154(b) by 380 days.

(21) Appl. No.: 18/152,338

(22) Filed: Jan. 10, 2023

(65) Prior Publication Data

US 2023/0219631 A1 Jul. 13, 2023

(30) Foreign Application Priority Data

Jan. 13, 2022 (IT) .................. 102022000000416

(51) Int. Cl.
*B62D 25/10* (2006.01)
*B62D 25/12* (2006.01)

(52) U.S. Cl.
CPC ............ *B62D 25/12* (2013.01); *B62D 25/10* (2013.01)

(58) Field of Classification Search
CPC ...... B62D 25/10; B62D 25/12; B62D 35/005; B60K 11/06
USPC .............. 296/193.11; 180/69.2, 69.24, 69.25
See application file for complete search history.

(56) References Cited

U.S. PATENT DOCUMENTS

| | | | | |
|---|---|---|---|---|
| 5,275,249 | A * | 1/1994 | Nelson ................... | B62D 25/12 180/69.2 |
| 2005/0001453 | A1* | 1/2005 | Endo .................... | B62D 25/105 296/193.11 |
| 2012/0280537 | A1* | 11/2012 | Quirk ..................... | B62D 25/10 296/193.11 |
| 2016/0368365 | A1* | 12/2016 | Jackson ................. | B62D 25/12 |
| 2017/0233012 | A1* | 8/2017 | Legrice .................. | B62D 25/12 296/193.11 |
| 2019/0039659 | A1* | 2/2019 | Glickman ................ | B60R 5/02 |
| 2019/0233022 | A1* | 8/2019 | Biancalana ............ | B62D 25/12 |
| 2020/0361539 | A1* | 11/2020 | Muhammad ............. | B32B 7/12 |
| 2021/0371018 | A1* | 12/2021 | Slight .................... | B62D 37/02 |
| 2021/0402870 | A1* | 12/2021 | Moradnia .............. | B60K 11/04 |
| 2023/0219631 | A1* | 7/2023 | Puglisi ................. | B62D 29/005 296/193.11 |
| 2024/0174297 | A1* | 5/2024 | Gomez ................. | E05F 15/616 |

OTHER PUBLICATIONS

Autocar: "Ferrari 812 Competizione Review 819 bhp, 450,000 Limited Edition Track Tested, Autocar," XP055956110, Retrieved from the Internet: URL: https://www.youtube.com/watch?v=84jRolWaot4, retrieved on Aug. 30, 2022, 3 pages.

(Continued)

*Primary Examiner* — Gregory A Blankenship
(74) *Attorney, Agent, or Firm* — CANTOR COLBURN LLP (57) ABSTRACT

A hood for a motor vehicle includes a framework base having a length extension along a first axis and a width extension along a second axis, a first covering panel fixed to the framework base so as to cover a first end of the framework base along the first axis over the entire width extension, a second covering panel fixed to the framework base so as to cover a second end of the framework base over the entire width extension, wherein the first and the second covering panel leave an intermediate portion of the framework base between the first and the second end, according to the first axis, uncovered.

15 Claims, 7 Drawing Sheets

(56) References Cited

OTHER PUBLICATIONS

Ferrari Press Office: "812 Competizione and 812 Competizione A: Two Interpretations of Ferrari's Racing Soul," XP055956137, Retrieved from the Internet: URL: https://www.ferrari.com/en-EN/corporate/articles/812-competizione-and-812-competizione-a-two-interpretations-of-ferraris-racing-soul; retrieved on May 5, 2021, pp. 1-9.
Italian Search Report for Application No. 102022000000416; Filing Date—Jan. 13, 2022; Date of Mailing—Aug. 30, 2022, 6 pages.

\* cited by examiner

HOOD FOR A MOTOR VEHICLE

CROSS-REFERENCE TO RELATED APPLICATIONS

This patent application claims priority from Italian patent application no. 102022000000416 filed on Jan. 13, 2022, the entire disclosure of which is incorporated herein by reference.

TECHNICAL FIELD

The invention concerns a hood for a motor vehicle, in particular a sports car.

PRIOR ART

As known, a motor vehicle includes a body, which comprises the more external parts of the motor vehicle and, therefore, those visible to the user. These parts typically also include the hoods, i.e., the hatches arranged respectively to cover an engine compartment and a trunk of the motor vehicle.

The following description will refer, in particular, to the hood covering the engine compartment, which houses the engine.

The latter hood can be found in a front or rear area of the motor vehicle, according to a moving direction of the motor vehicle, based on the position of the engine.

The engine, whether of the combustion or electric kind, is a device for transforming a quantity of energy into output to move the motor vehicle. Thus, the engine also produces heat in its operation.

In particular, the heat produced by a combustion engine, more precisely a common internal combustion engine, may be relatively significant.

Therefore, the engine must be effectively cooled. In addition, the components positioned in the engine compartment must also be designed so as to resist the heat transferred by the engine to the engine compartment.

In general, there is a need to reduce or minimise an accumulation of heat produced by the engine inside the engine compartment.

The accumulation is favoured by the hood and by the surrounding, more external parts of the body that typically close the engine compartment.

By reducing the accumulation, for example, the size of a cooling apparatus for the engine and the components of the engine compartment may be reduced.

At the same time, the need described above must not lead to the production of structural elements that are not suitable to resist normal aerodynamic loads associated with using the motor vehicle.

Instead, in the case of alterations to structural elements, for example the parts of the body of the motor vehicle, the need is felt to ensure the resistance of the same to aerodynamic loads, possibly achieving a good balance between resistance and weight.

One purpose of the invention is to meet at least one of the above-mentioned needs.

DESCRIPTION OF THE INVENTION

The purpose is achieved with a hood according to claim 1.

The dependent claims define particular embodiments of the invention.

BRIEF DESCRIPTION OF THE DRAWINGS

Below, an embodiment of the invention will be described to better understand the same by way of non-limiting example and with reference to the attached drawings in which.

EMBODIMENTS OF THE INVENTION

Figure 1:
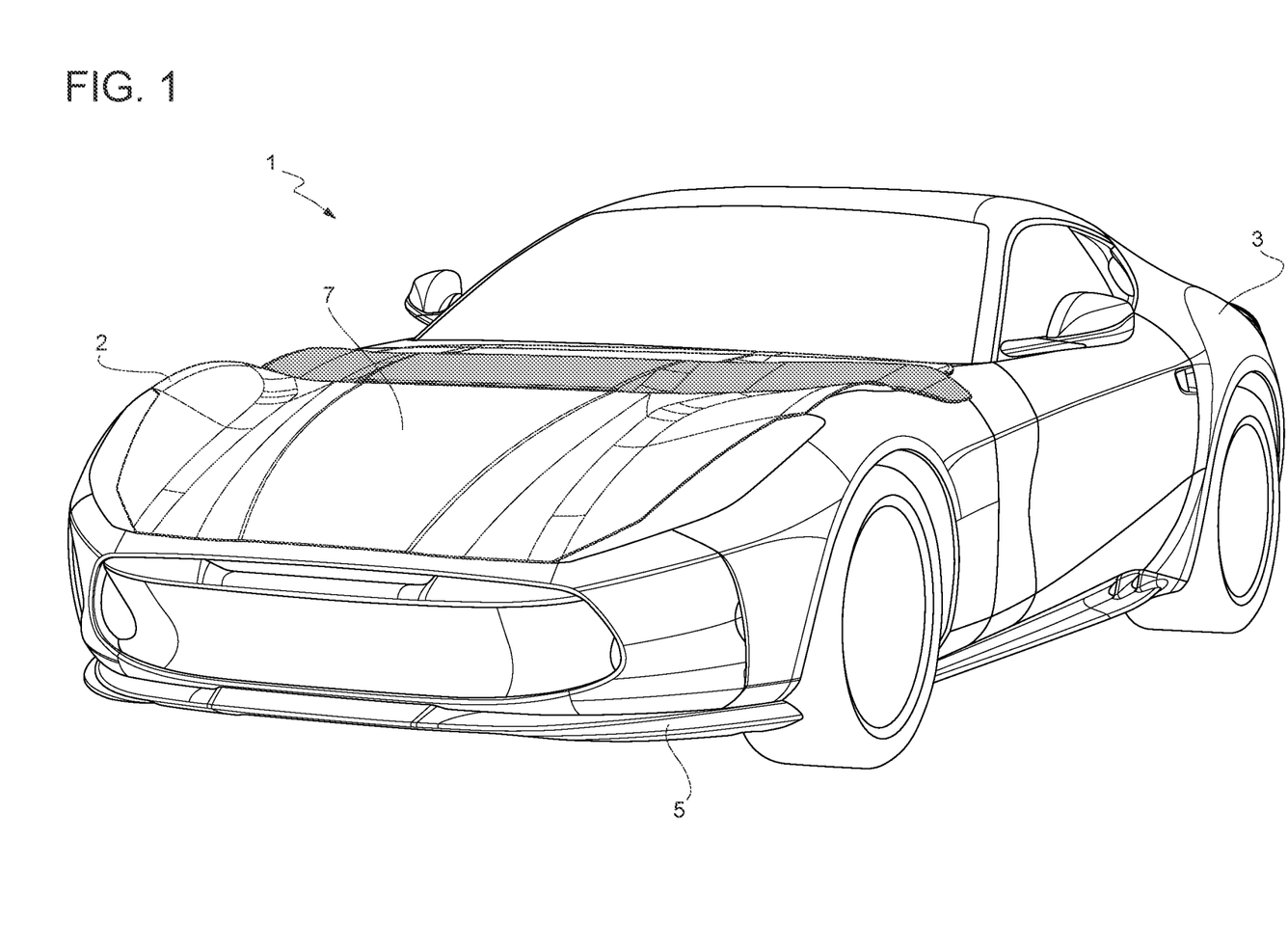
FIG. 1 is a perspective view of a motor vehicle that comprises a hood according to the invention.

In FIG. 1, the reference number 1 is used to indicate, as a whole, a motor vehicle.

Figure 2:
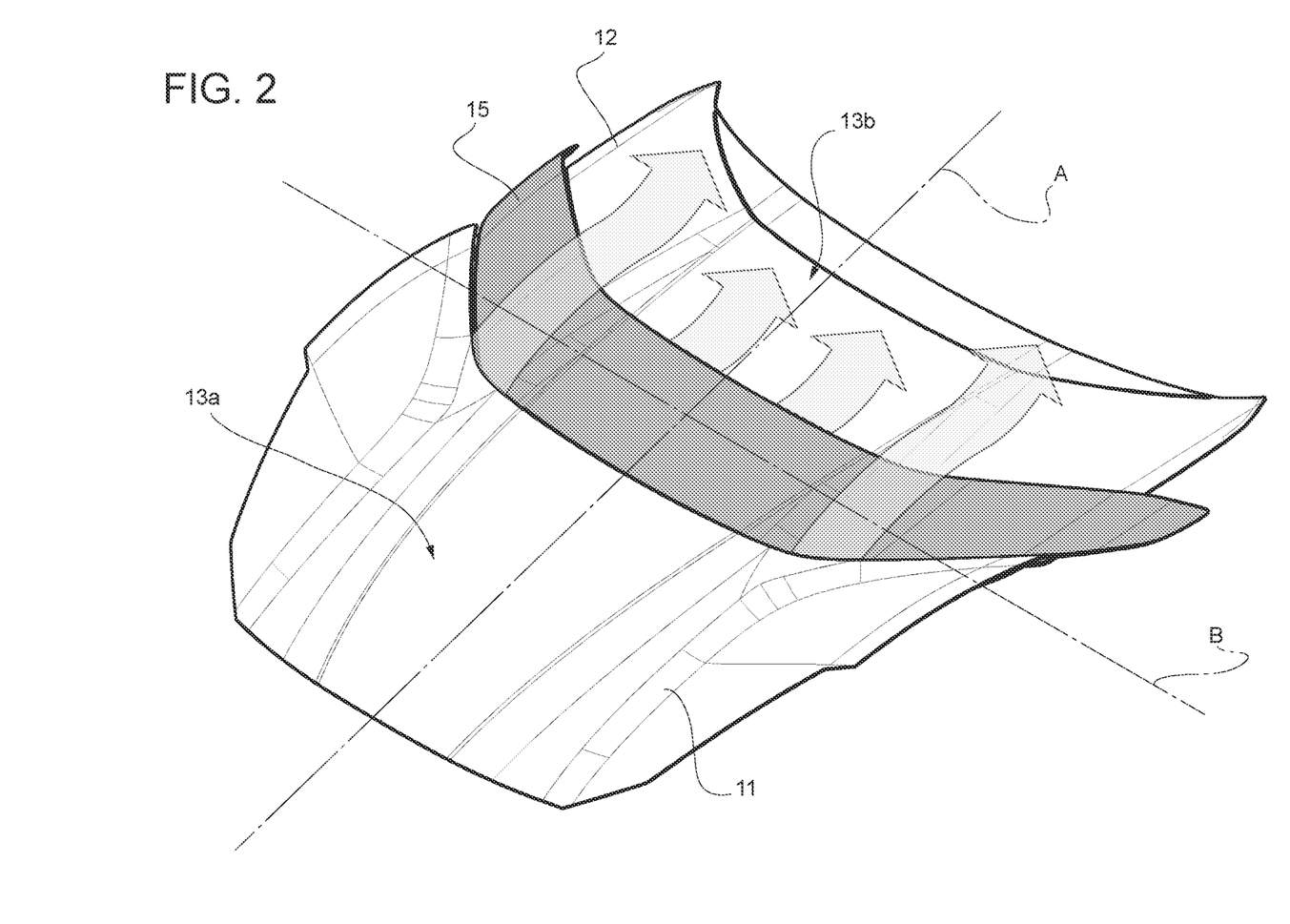
FIG. 2 is a perspective view, on an enlarged scale, of the hood of the motor vehicle in FIG. 1.

The motor vehicle 1 has a front part 2 and a rear part 3, according to its moving direction, represented in FIG. 2 via a straight longitudinal axis A.

In addition, the motor vehicle 1 comprises a body 5 and a hood 7, in particular a front hood at the front part 2. The hood 7 is mounted on the body 5.

The hood 7 covers or closes an engine compartment that is not illustrated, which houses a known engine that is also not illustrated.

The hood 7 comprises a framework base or skeleton 8 (FIG. 6), which has a length extension along the axis A and a width extension along an axis B orthogonal to the axis A. The axes A and B belong to a plane, horizontal in use. Therefore, in use, the axes A and B are horizontal. As already mentioned above, the axis A coincides with the moving direction of the motor vehicle 1.

Figure 6:
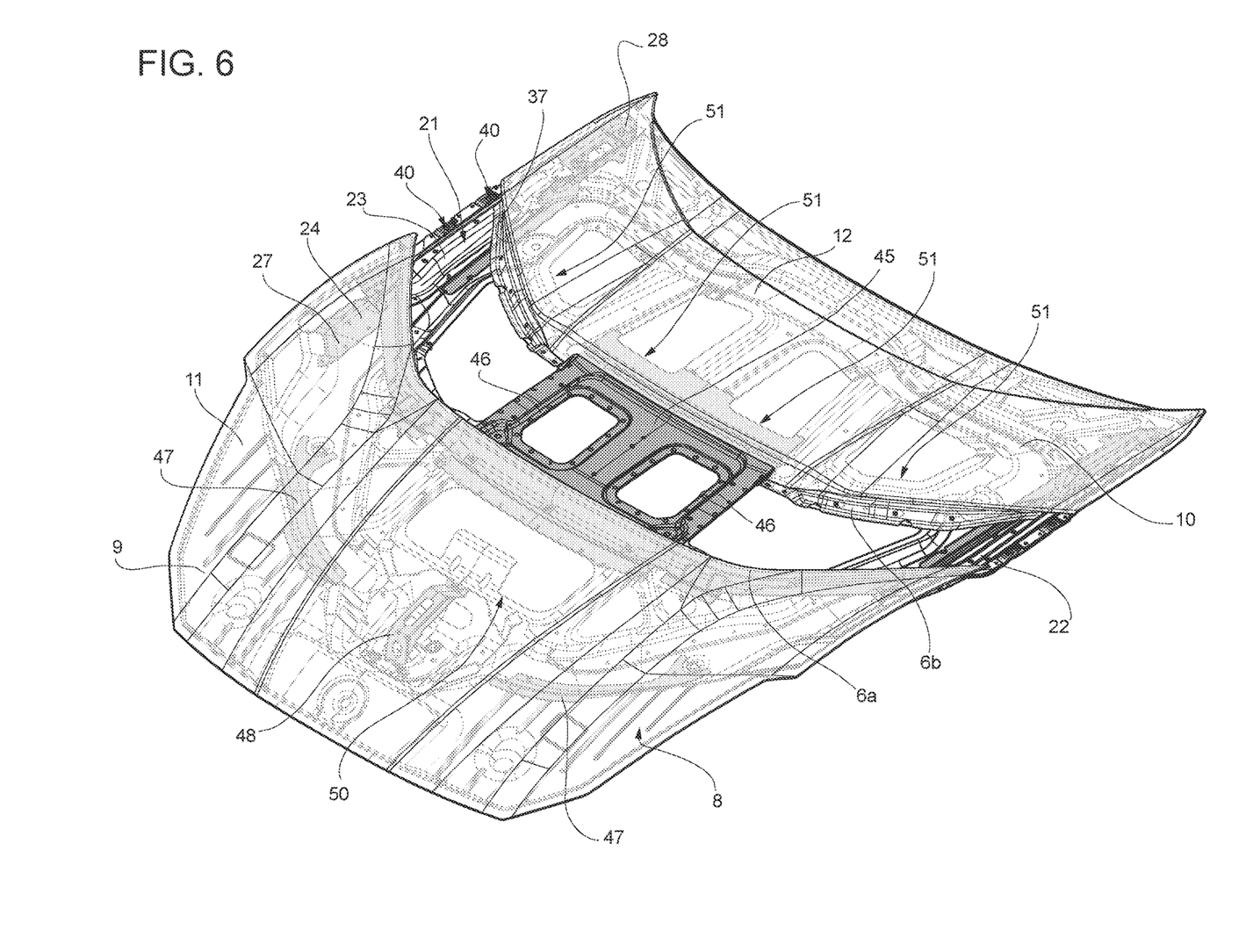
FIG. 6 is similar to FIG. 3 and shows the hood with the panel removed as in FIG. 3 and another two panels represented here as transparent.

The framework base 8 has two opposite ends 9, 10 along the axis A. The end 9 is the end more at the front, i.e., it belongs to a front end of the motor vehicle 1.

In addition, the hood 7 comprises two covering panels 11, 12 fixed to the framework base 8 so as to cover, respectively, the ends 9, 10, for the entire width extension of the framework base 8.

In more detail, the covering panels 11, 12 are, respectively, fixed, in particular seamed to structural elements with channels 6*a*, 6*b*.

The covering panels 11, 12 define respective outer surfaces 13*a*, 13*b* of the hood 7. The outer surfaces 13*a*, 13*b* are defined on one side opposite the framework base 8. In other words, the outer surfaces 13*a*, 13*b* face the outside of the motor vehicle 1.

In particular, the covering panels 11, 12 are sheets made of metal, for example sheets comprising or made of aluminium.

The covering panels 11, 12 leave an intermediate portion 14 of the framework base 8 uncovered; the intermediate portion 14 is arranged between the ends 9, 10, according to the axis A.

In particular, the intermediate portion 14 is left uncovered by the covering panels 11, 12 for the entire width extension of the framework base 8.

This does not mean that the intermediate portion 14 is not covered in part or entirely using other elements, devices, structures, panels, or the like, but simply that the panels 11, 12 do not cover the intermediate portion 14.

In fact, preferably, the hood 7 comprises an additional covering panel 15 fixed to the framework base 8 so as to cover the intermediate portion 14 at least partially. In more detail, the covering panel 15 covers only part of the intermediate portion 14.

Here and below, the expression "to cover" is intended as a synonym for "to coat". In the use context of the motor vehicle 1, covering may be understood to mean positioned above. The expression "use context" of the motor vehicle 1 is here and below used to identify a condition wherein the hood 7 is mounted on the body 5.

The covering panel 15 has a wing shape; in addition, the covering panel 15 comprises or is made of carbon fibre. The covering panel 15 has, for the most part, the mere function of covering; in particular, notwithstanding the wing shape, the covering panel 15 is not suitable for generating downforce.

Figure 3:
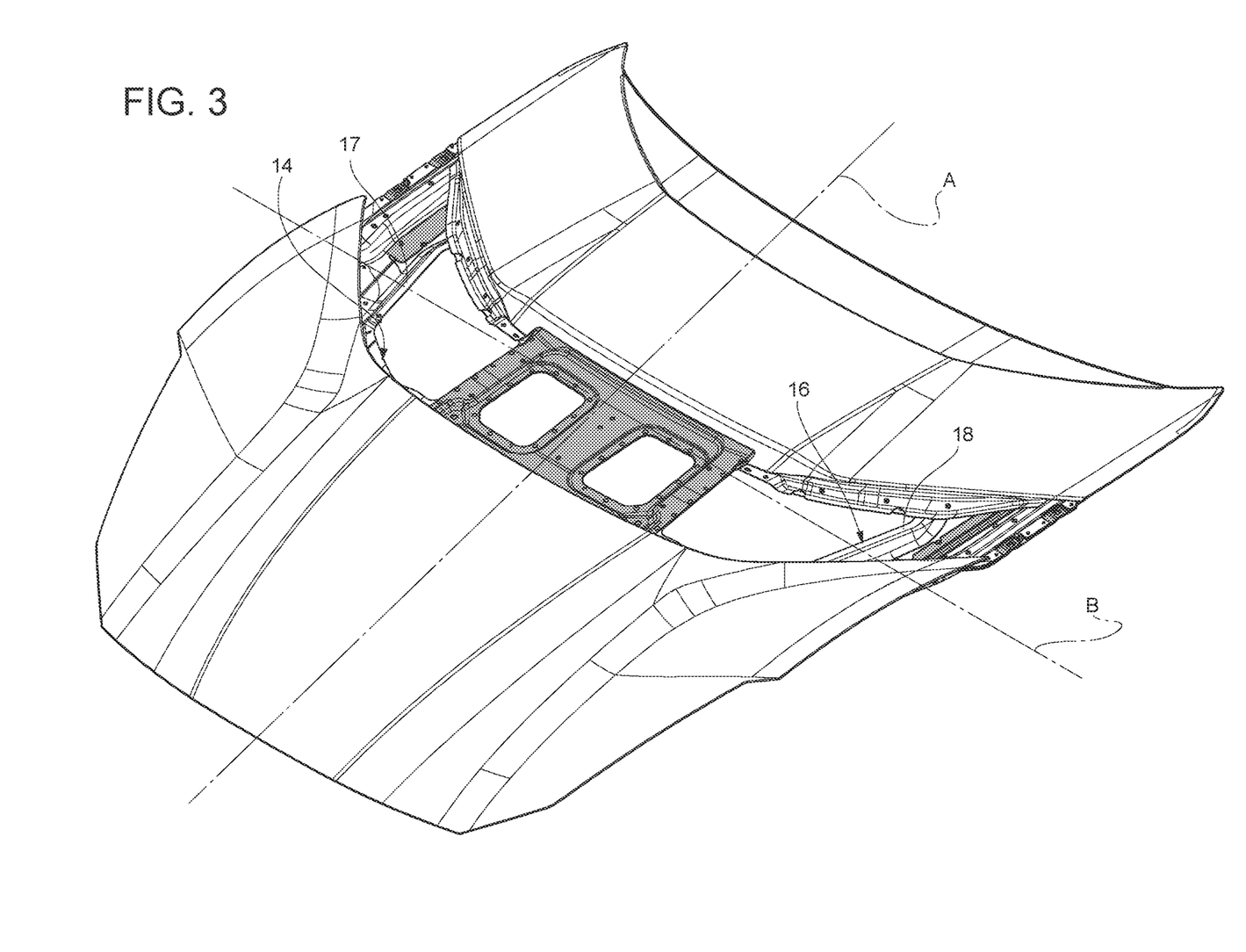
FIG. 3 is similar to FIG. 2 and shows the hood with a panel removed for clarity.

The intermediate portion 14 has a through opening 16 (FIG. 3) according to a direction that is transversal, more precisely orthogonal, to the plane comprising the axes A, B. In the use context of the motor vehicle 1, the direction is vertical.

The portion 14 comprises two end portions 17, 18, which are opposite according to the axis B. According to the axis B, the through opening 16 is arranged between the two end portions 17, 18.

The end portions 17, 18 may be the same as each other and arranged symmetrically in relation to the axis A.

Thus, an empty volume is defined between the covering panels 11, 12 or between the ends 9, 10 according to the axis A. The same empty volume can also be defined between the end portions 17, 18, according to the axis B. More precisely, the empty volume is defined between the covering panel 15 and the through opening 16, according to the direction transverse to the plane comprising the axes A, B. Thus, even more precisely, the empty volume may be considered defined between the through opening 16, the covering panel 15, the end portions 17, 18, and the ends 9, 10.

Figure 5:
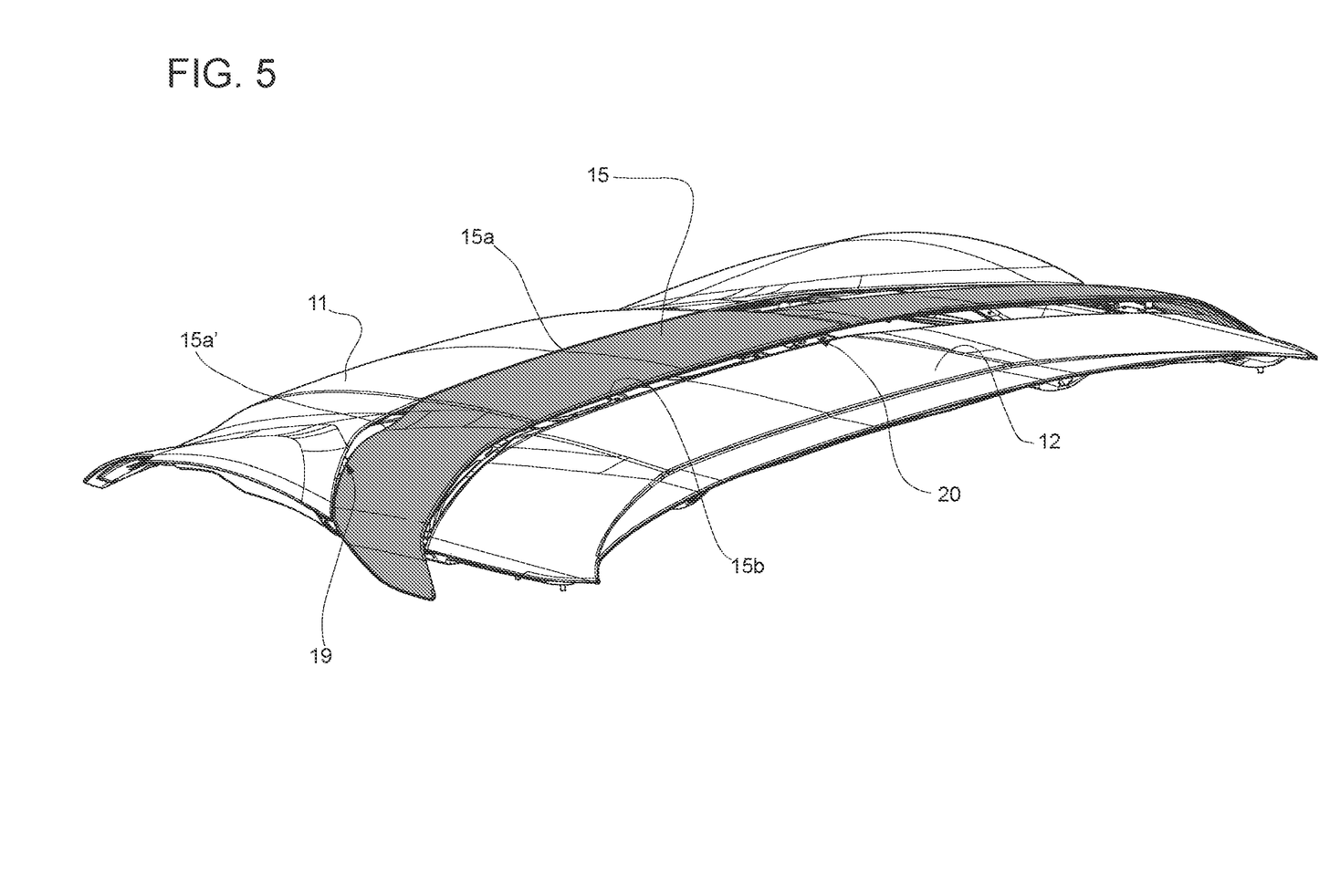
FIG. 5 is similar to FIG. 2, but according to a different point of perspective view.

Preferably, as more clearly visible in FIG. 5, the framework base 8 and, in more detail, the end 9 has at least one through opening 19 along the axis A or a direction parallel thereto. In other words, the through opening 19 is transversal to the plane comprising the axes A, B. In addition, the through opening 19 is transversal to the through opening 16. In this way, the empty volume communicates via the through opening 19 with an additional empty volume defined on a side opposite the framework base 8 in relation to the covering panel 11, i.e., with a portion of the engine compartment, which, in particular, actually houses the engine.

More specifically, according to the axis B, the through opening 19 is found between the centre of the intermediate portion 14 and the end portion 18, in particular, approximately halfway between these.

In detail, the framework base 8 has another opening 19 that cannot be seen in FIG. 5 between the centre of the intermediate portion 14 and the end portion 17, according to the axis B, in particular arranged symmetrically to the opening 19 that can be seen in FIG. 5, according to the axis A.

As can be seen in FIG. 5 and FIG. 2, the covering panel 15 ends along the axis A towards the covering panel 11 with an edge 15a having at least one central segment arranged in line with the covering panel 11; more specifically, the edge 15a has an end segment 15a' which moves away from the covering panel 11 towards the intermediate portion 14 or downwards, in the use context of the motor vehicle 1, so that the opening 19 is directly in communication with the outside of the motor vehicle 1, or with the side of the hood 7 opposite that of the framework base 8.

In this way, an airflow is allowed between the end segment 15a' and the covering panel 11.

In addition, the covering panel 15 ends along the axis A towards the covering panel 12 with an edge 15b, which moves away from the covering panel 12 in a direction moving away from the framework base 8 or upwards, in the use context of the motor vehicle 1, so as to open a gap 20 between the covering panels 15, 12.

In this way, an airflow is allowed between the edge 15b and the covering panel 12.

Since the panel 15 is made of a material other than metal, but especially in light of the presence of the through opening 16, the hood 7 is suitably, structurally reinforced at the end portions 17, 18.

Thus, conveniently, the hood 7 comprises two box-shaped beams 21, 22 (FIG. 6) that extend according to or parallel to the first axis A and are fixed to the framework base 8 at the end portions 17, 18, respectively. In this way, the box-shaped beams 21, 22 structurally reinforce the hood 7 at the end portions 17, 18.

The box-shaped beams 21, 22 may, essentially, be similar, so that only the box-shaped beam 21 will be considered below, given that what is indicated for the box-shaped beam 21 can also apply to the other box-shaped beam 22. More specifically, the box-shaped beams 21, 22 are arranged symmetrically in relation to the axis A.

The box-shaped beam 21 preferably has a greater extension according to the axis A in relation to the end portion 17. More specifically, as derivable from FIG. 6, the box-shaped beam 21 is fixed to the framework base 8 at the end 9 and/or at the other end 10 as well.

The box-shaped beam 21 is partially covered by the covering panel 11 and/or by the other covering panel 12. More precisely, the covering panels 11, 12 respectively and independently cover the ends of the box-shaped beam 21 according to the axis A.

In more detail, the box-shaped beam 21 comprises a plate 23 and another plate 24 fixed to the plate 23 and to the framework base 8 between the plate 23 and the framework base 8.

In particular, the plate 24 is fixed to the plate 23 using fixing members, such as rivets. In addition, independently, the plate 24 is fixed to the other plate 23 using fixing members, such as rivets and/or by gluing, for example using a structural glue.

The plates 23, 24 fixed between them form the box shape of the box-shaped beam 21.

Figure 4:
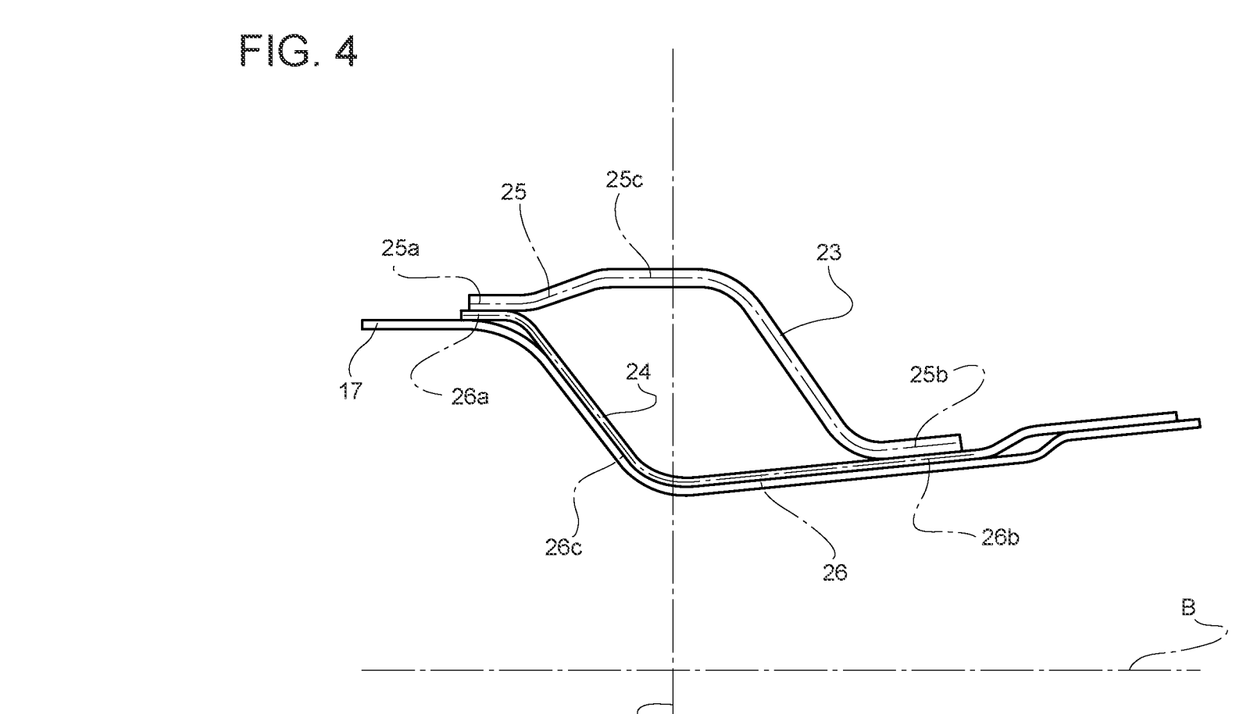
FIG. 4 shows a cross-section of a box-shaped beam that is part of the hood.

This is especially clear in FIG. 4, which represents a cross-section of the hood 7 at the end portion 17, according to a plane transverse to the plane comprising the axes A, B. Thus, FIG. 4 includes the cross-section of the box-shaped beam 21 at the end portion 17.

The box-shaped form or cross-section of the box-shaped beam 21 is not necessarily maintained for the whole extension of the box-shaped beam 21 along the axis A. Rather, the cross-sections of the box-shaped beam 21 change along the axis A and are determined by the shape of the plates 23, 24.

At the end portion 17, the cross-sections of the box-shaped beam 21 are preferably all box-shaped cross-sections.

In particular, one or each of the plates 23, 24 has a concavity facing the other of the plates 23, 24, thus forming the box shape. As can be seen in FIG. 4, both the plates 23, 24 have respective concavities facing each other, thus forming the box shape. This happens, more particularly, at the end portion 17.

The cross-section of the plate 23 in FIG. 4 extends according to a curved profile 25 with two inflection points, i.e., points inverting the concavity. In addition, more specifically, the inflection points are placed at the ends 25a, 25b of the curved profile 25 according to the axis B. In particular, the curved profile 25 has an intermediate segment 25c that is straight, specifically parallel to the axis B. The end 25a is further than the other end 25b from the centre of the hood 7, according to the axis B. The inflection point of the end 25a preferably has a height according to an axis C, orthogonal to the axes A, B, other than that of the inflection point of the end 25b. In particular, in the use context of the vehicle 1, the end 25a is higher than the other end 25b. In addition, preferably, the inflection point of the end 25a is less distant from the intermediate segment 25c than the inflection point of the other end 25b. The intermediate segment 25c is an end up high for the curved profile 25, according to the axis C. In this paragraph, each phrase describes independent features, i.e., not inextricably linked to the others.

The cross-section of the plate 24 in FIG. 4 extends according to a curved profile 26. The curved profile 26 has an inflection point at one end 26a. In addition, independently, the curved profile 26 has an inflection point at one end 26b that projects along the axis B in relation to the curved profile 25. More precisely, the latter inflection point is found in an area projecting from the end 26b. The curved profile 26 preferably has a concave intermediate segment 26c with an end point up high according to the axis C. More specifically, the tangent to the curved profile 26 in the end point up high is not orthogonal to the axis C but is orthogonal to an additional axis that forms an acute angle with the axis C towards the end 26b. The end 26a is further than the end 26b from the centre of the hood 7, according to the axis B. The inflection point of the end 26a preferably has a height according to the axis C other than that of the inflection point of the end 26b. In particular, in the use context of the vehicle 1, the end 26a is higher than the other end 26b. In this paragraph, each phrase describes independent features, i.e., not inextricably linked to the others.

In particular, the ends 25a, 26a are in contact with each other, like the ends 25b, 26b. The intermediate segments 25c, 26c are spaced apart along the axis C.

The plate 23 preferably has a greater thickness than the other plate 24. This is true for at least one cross-section of the box-shaped beam 21 as can be seen in FIG. 4. More preferably, this is true for all the cross-sections of the box-shaped beam 21, given that these cross-sections contain both the cross-sections of the plates 23, 24.

In addition, conveniently, the plates 23, 24 respectively comprise a first and a second material, of which the first material is less stress resistant than the second material. For example, the first material may be aluminium. The second material may be steel.

The stress resistance may be resistance to tensile and/or buckling stresses.

In the embodiment illustrated in FIG. 6, the plate 24 extends projecting in relation to the plate 23, both according to the axis A and the axis B. This is non-limiting, since variants could exist according to which the plate 24 projects in relation to the other plate 23 according to only one of the axes A, B.

Along the axis A, the plate 24 has two ends or plate ends 27, 28 respectively covered by the covering panels 11, 12.

The end 28 has a through slot 29 and, in particular, projects in relation to the plate 23, both according to axis A and axis B. According to the axis B, the end 28 projects towards the centre of the hood 7.

The end 27 ends along the axis A with an edge 27a having a concave segment 27b according to a direction leading away from the plate 23, i.e., towards the end 9. The segment 27b defines an undercut of the end 27 along the axis A with the purpose of lightening the plate 24.

In particular, the end 27 projects in relation to the plate 23 according to the axis B, more particularly towards the centre of the hood 7.

In addition, along the axis A, the plate 24 comprises an intermediate band 30 covered by the plate 23. The intermediate band 30 is arranged between the ends 27, 28, along the axis A.

Figure 7:
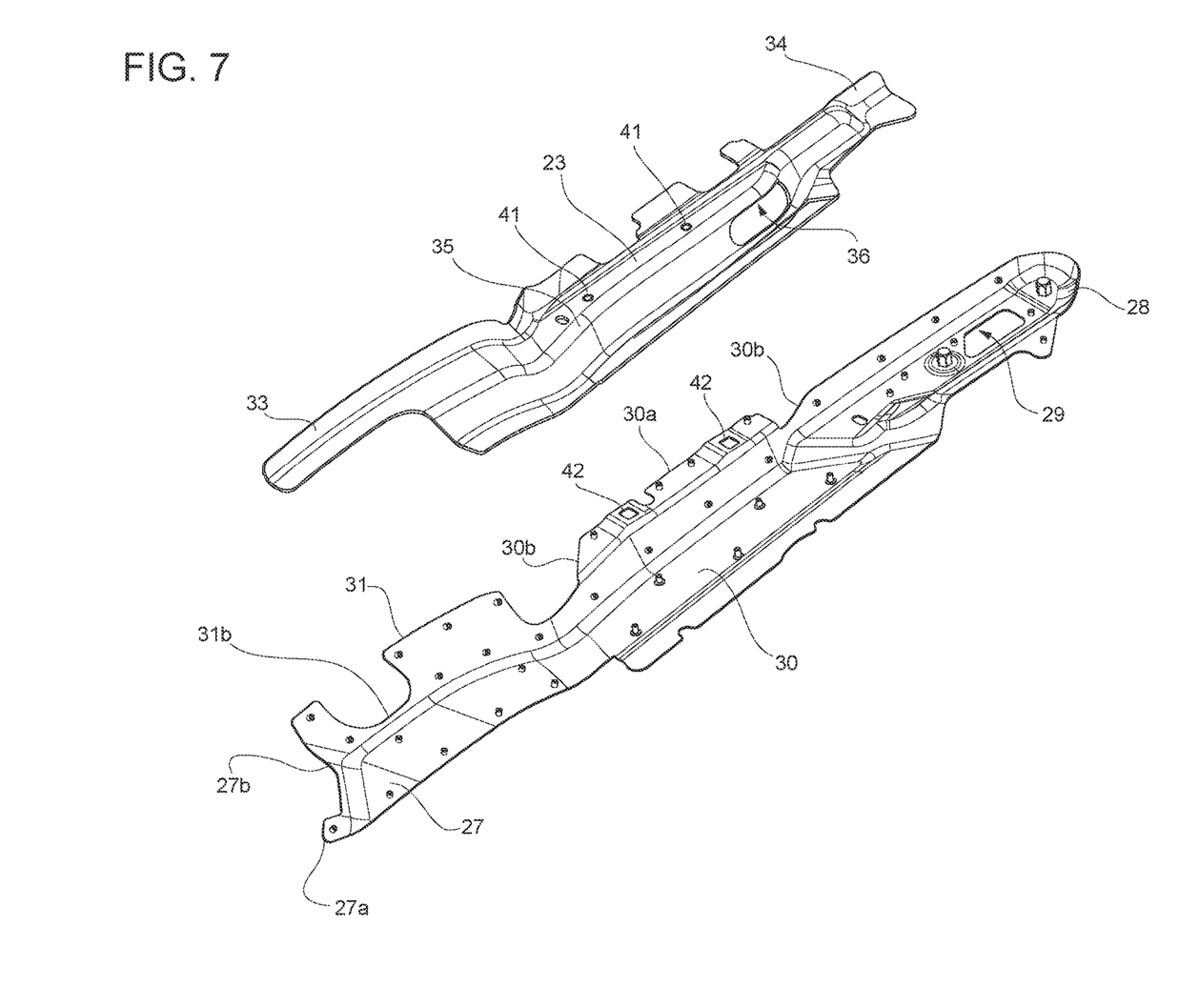
FIG. 7 is an exploded view of the box-shaped beam, whose cross-section is shown in FIG. 4.

As more clearly seen in FIG. 7, the intermediate band 30 has an edge 30a with one or more concave segments 30b facing the outside of the hood 7. The concave segments 30b define corresponding undercuts of the intermediate band 30 along the axis B with the purpose of lightening the plate 24.

In addition, preferably, the end 27 has an edge 31 in one area covered by the plate 23. This area is the one further from the centre of the hood 7 according to the axis B. The edge 31 has a concave segment 31b facing the outside of the hood 7. The concave segment 31b defines an undercut of the end 27 along the axis B.

Conveniently, as can be seen in FIG. 7, the plate 23 has two ends or plate ends 33, 34 along the axis A, as well as an intermediate band 35 between the ends 33, 34, along the axis A. The plate 23 narrows according to the axis B at the ends 33, 34. In addition, in particular, the ends 33, 34 comprise corresponding regions that are basically flat. In contrast, in detail, all the cross-sections of the intermediate band 35 are concave.

Similarly, though independently, the ends 27, 28 are narrower according to the axis B in relation to the intermediate band 30.

The plate 23 preferably has a through opening 36 along the axis B or a direction parallel to it. In detail, the opening 36 is located in a concave area of the plate 23, in more detail on one, more internal, side of the plate 23 in relation to the centre of the hood 7 along the axis B. In particular, the opening 36 is located at one edge 37 of the covering panel 12 (FIG. 6).

In general, without any loss of generality, any detail illustrated in FIG. 7 has a structural role that is independent of the other details and, thus, disconnected from them.

The box-shaped beam 21 preferably has at least one through hole 40, more precisely two through holes 40 along a direction transverse, in particular orthogonal, to the plane comprising the axes A, B. Each through hole 40 comprises corresponding holes 41, 42 aligned between them along the transverse direction and respectively formed on the plates 23, 24.

The covering panel 15 is fixed to the intermediate portion 14 using fixing devices, which are not illustrated, through the through holes 40.

In addition to the box-shaped beams 21, 22, the hood 7 may comprise additional, structurally reinforcing elements independent of each other.

For example, the hood 7 comprises a plate 45 arranged at the through opening 16; the plate 45 extends along the axis A between two ends respectively fixed to the ends 9, 10. Thus, the plate 45 has a length according to the axis A that is greater than a length of the through opening 16 according to the same axis A. In particular, the plate 45 has two holes 46 arranged symmetrically in relation to the axis A.

In addition, the hood 7 comprises two plates 47 fixed to the framework base 8 at the end 9. The plates 47 are arranged symmetrically in relation to the axis A and extend along corresponding arched profiles facing the centre of the hood 7.

In addition, the hood 7 comprises a plate 48 fixed to the framework base 8 at a central region of the end 9 according to the axis B. In particular, according to a plate orthogonal to the axis B, the plate 48 has a trapezoidal cross-section.

In addition, the end 9 may comprise an opening 50 at the central area according to the axis B.

Similarly, though independently, the end 10 may comprise multiple openings 51 aligned along the axis B and arranged symmetrically in relation to the axis A.

From the above, the advantages of the hood 7 are clear.

The intermediate portion 14 is left uncovered by the covering panels 11, 12. In addition, the same intermediate portion 14 has the through opening 16. This creates, in fact, multiple vents that allow the airflows through the hood 7. In addition, the through opening 19 increases the possibility of airflows. In this way, the accumulation of the heat produced by the engine is reduced compared to known hoods.

The box-shaped beams 21, 22 significantly increase the resistance of the hood 7, without excessive increases in weight thanks to their box shape. The plates 23, 24 make it possible to create the box shape simply.

In addition, the thickness, the materials, and the form of the plates 23, 24 are chosen so as to achieve an optimal compromise between the reduction in weight, reduction in size, and increase in resistance of the hood 7.

Finally, it is clear that changes may be made to the hood 7 according to the invention, and variations produced thereof, that, in any case, do not depart from the scope of protection defined by the claims.

For example, the number or shape of the components described and illustrated could vary, without any loss of generality.

In addition, expressions like "along the axis" may always be interpreted as "according to a direction parallel to the axis".

The invention claimed is:

1. A hood (7) for a motor vehicle (1), the hood (7) being configured to be mounted on a body (5) of the motor vehicle (1) and comprising
    a framework base (8) having a length extension along a first axis (A) and a width extension along a second axis (B) orthogonal to the first axis (A), the first axis (A) being such as to coincide with a moving direction of the motor vehicle (1) when the hood (7) is mounted on the motor vehicle (1),
    a first covering panel (11) fixed to the framework base (8) so as to cover a first end (9) of the framework base (8) along the first axis (A) over the entire width extension, thereby defining a first outer surface (13a) of the hood on the opposite side relative to the framework base (8),
    a second covering panel (12) fixed to the framework base (8) so as to cover a second end (10) of the framework base (8) over the entire width extension, thereby defining a second outer surface (13b) of the hood (7) on the opposite side relative to the framework base (8), the second end (10) being opposite the first end (9) along the first axis (A),
    wherein the first and the second covering panel (11, 12) leave an intermediate portion (14) of the framework base (8) between the first and the second end (9, 10), according to the first axis (A), uncovered.

2. The hood according to claim 1, wherein the intermediate portion (14) has a first through opening (16) according to a direction transversal to a plane comprising the first and the second axis (A, B).

3. The hood according to claim 1, wherein the framework base (8) has at least one second through opening (19) along a direction parallel to the first axis (A), whereby an empty volume between the first and the second covering panel (11, 12) along the first axis (A) communicates with a further empty volume by means of the second through opening (19), the further empty volume being defined on an opposite side of the framework base (8) relative to the first covering panel (11).

4. The hood according to claim 1, wherein the intermediate portion (14) comprises two opposite end portions (17, 18) according to the second axis (B), the hood (7) comprising two box-shaped beams (21, 22) extending according to the first axis (A) and fixed to the framework base (8) at the end portions (17, 18), respectively.

5. The hood according to claim 4, wherein at least one or each one of the box-shaped beams (21, 22) comprises a first plate (23) and a second plate (24) fixed to the first plate (23) and to the framework base (8) between the first plate (23) and the framework base (8).

6. The hood according to claim 5, wherein at least one or each one of the first and second plate (23, 24) has a concavity facing the other one of the first and second plate (23, 24).

7. The hood according to claim 5, wherein the first plate (23) has a greater thickness than a further thickness of the second plate (24) according to at least a cross section of the corresponding one of the box-shaped beams (21, 22).

8. The hood according to claim 5, wherein the first and the second plate (23, 24) comprise a first and a second material, respectively, the first material being less stress resistant than the second material.

9. The hood according to claim 5, wherein the second plate (24) extends projecting relative to the first plate (23) according to the first and/or the second axis (A, B).

10. The hood according to claim 5, wherein the second plate (24) has a first plate end (28) along the first axis (A), the first plate end (28) having a through slot (29); and/or a second plate end (27) along the first axis (A) ending with an edge (27a) having a concave segment (27b) facing in a direction leading away from the first plate (23); and/or an intermediate band (30) along the first axis (A) covered by the first plate (23), the intermediate band (30) having an edge (30a) with one or more concave segments (30b) facing the outside of the hood (7).

11. The hood according to claim 5, wherein the first plate (23) has a third through opening (36) along a direction parallel to the second axis (B).

12. The hood according to claim 4, wherein a or each one of the box-shaped beams (21, 22) has at least one through hole (40) along a direction transversal to a plane comprising the first and the second axis (A, B).

13. The hood according to claim 1, comprising a third covering panel (15) fixed to the intermediate portion (14) so as to partially cover the intermediate portion (14).

14. The hood according to claim 13, wherein a or each one of the box-shaped beams (21, 22) has at least one through hole (40) along a direction transversal to a plane comprising the first and the second axis (A, B), wherein the third covering panel (15) is fixed to the intermediate portion (14) by means of fixing means arranged through the through hole (40).

15. A motor vehicle (1) comprising a body (5) and a hood (7) according to claim 1, the hood (7) being mounted on the body (5) with the first axis (A) coinciding with the moving direction of the motor vehicle.

\* \* \* \* \*